Aug. 5, 1969

B. F. GILES ET AL 3,460,064

CANCELLATION OF HORIZONTALLY TRAVELING NOISE
IN MARINE SEISMIC EXPLORATION
Filed Jan. 17, 1968

INVENTORS
*BEN F. GILES
HOWARD L. VIGER*

*Jerry W. Mills*
ATTORNEY

United States Patent Office 3,460,064
Patented Aug. 5, 1969

3,460,064
CANCELLATION OF HORIZONTALLY TRAVELING NOISE IN MARINE SEISMIC EXPLORATION
Ben F. Giles, Dallas, Tex., and Howard L. Viger, Metairie, La., assignors to Texas Instruments Incorporated, Dallas, Tex., a corporation of Delaware
Filed Jan. 17, 1968, Ser. No. 698,571
Int. Cl. G01v 1/38
U.S. Cl. 340—15.5     8 Claims

ABSTRACT OF THE DISCLOSURE

An array of spaced apart seismic disturbance sources are streamed behind a marine vessel and are simultaneously actuated to generate seismic disturbances. The direct vertical reflections from the seismic disturbances are received at reception points streamed behind the marine vessel and appear to emanate from a point source. Horizontally traveling wave trains resulting from the seismic disturbances arrive at the reception points out of phase with one another and therefore tend to cancel one another.

---

This invention relates to marine seismic exploration, and more particularly to a method and apparatus for canceling horizontally traveling noise in marine seismic exploration.

It is a common practice today to generate seismic disturbances in a marine environment and then to detect reflections from the disturbances at points along an elongated hydrophone streamer in order to provide information regarding the ocean bottom. However, meaningful information contained by waves directly reflected from the ocean bottom is often masked due to the reception of horizontally traveling noise caused by reflections of horizontal waves from underwater obstacles and the like.

In land based seismic exploration, it has heretofore been known to dispose dynamite charges in a predetermined spaced array on the surface of the earth so as to cancel certain horizontally traveling wave components when the dynamite is fired. However, such techniques utilizing dynamite sources have not heretofore been practical for marine exploration, due to the operational costs of laying out and maintaining the positions of the dynamite shots on the ocean surface. Techniques have been developed for marine seismic exploration wherein seismic waves are generated from more than one nondynamite source of seismic energy towed behind a marine vessel, but such practices have generally been for the purpose of reinforcing the strength of the generated waves due to limitations in the power of the sources.

In accordance with the present invention, an array of spaced apart seismic disturbance sources are linearly streamed behind a marine vessel in a generally horizontal plane. The seismic sources are simultaneously actuated in order to generate seismic disturbances whose direct vertical reflections appear to emanate from a point source when the reflections are received at reception points streamed behind the marine vessel. Horizontally traveling wave trains from the seismic disturbances arrive at the reception points out of phase with one another due to the horizontal spacing of the sources.

For a more complete understanding of the present invention and for further objects and advantages thereof, reference may now be had to the following description taken in conjunction with the accompanying drawings in which.

Figure 1:
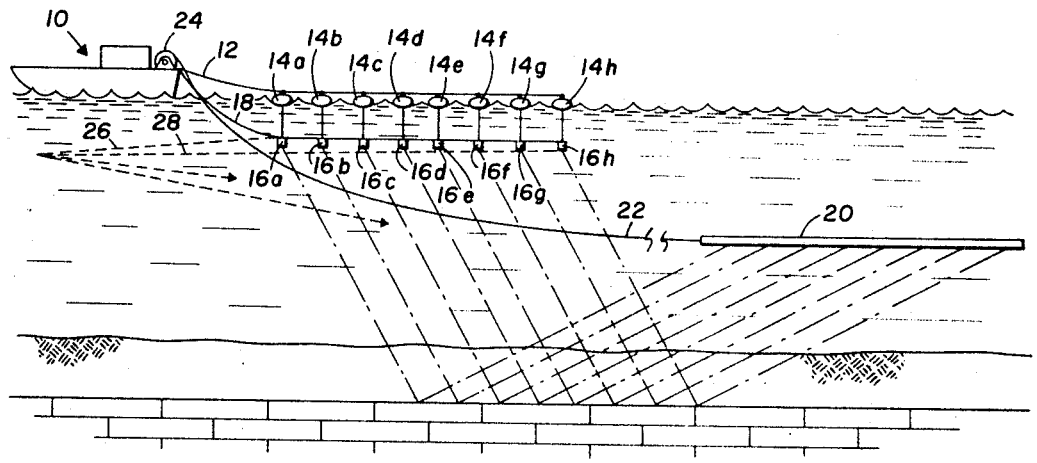
FIGURE 1 illustrates a somewhat diagrammatic side view of an embodiment of the present invention.

FIGURE 1 illustrates a preferred embodiment of the present invention wherein a marine vessel 10 streams a cable 12 connecting together a plurality of spaced apart float members 14a–14h. A like number of nondynamite seismic disturbance sources 16a–16h depend from the float members from cables so that the sources are towed behind vessel 10 at equal depths, which may be, for instance, about twenty-five feet. The sources 16a–16h are coupled together by chains so that the desired spacing between the sources is maintained.

Although eight sources have been illustrated, larger numbers of sources may be desirable for many applications. The seismic sources 16a–16h may comprise any suitable nondynamite source such as air guns of the type manufactured and sold by Bolt Associates & Company, of East Norwalk, Conn. When air guns are used, air is supplied to each of the sources through line 18. Alternatively, sources 16a–16h may comprise a chamber in which a gas mixture such as air, acetylene and butane is fired by suitable electrical circuitry. Alternatively, the seismic sources may comprise spaced apart electrodes in which a series of potentials are imposed across to generate a pressure wave underwater. With the use of the last two types of sources, electrical connections between the sources and control circuitry on the vessel 10 are provided via the line 18. For improved seismic data, it is often advantageous to provide seismic wave sources having differing fundamental frequencies.

The seismic sources 16a–16h are simultaneously actuated in order to generate vertically traveling seismic waves which are reflected from geological strata and received by hydrophones contained in an elongated streamer 20. Streamer 20 is towed behind the vessel 10 by a cable 22 extending from a reel 24, although the streamer 20 could be, if desired, towed from a second marine vessel. A lead-in extending from the vessel 10 maintains the streamer 20 in a substantially level position at the desired depth, which may be for example about fifty feet.

An important aspect of the present invention is that the seismic sources 16a–16h are properly spaced so that the vertical reflections received by the hydrophones appear to emanate from a point source. This has been accomplished in practice by streaming a linear array of equally spaced seismic wave sources of a total length up to three hundred fifty feet, in combination with the towing of a linear hydrophone streamer having a length ranging from forty-eight hundred to seventy-two hundred feet and positioned several hundred feet behind the seismic wave sources.

FIGURE 1 illustrates the simultaneous actuation of the seismic wave sources 16a–16h and the upward reflection of vertically traveling wave trains to the hydrophone streamer 20. However, FIGURE 1 also illustrates the generation of a horizontally traveling wave train by the source 16a which travels along the path 26 and is reflected by an underwater obstruction. Simultaneously, a wave train is generated by the source 16h which travels generally along the path 28 and is reflected by the same obstruction. Unless portions of these wave trains are canceled, reflections from the wave trains will be received by the streamer 20 as noise.

The two wave trains are initially generated having the same phase. However, due to the horizontal spacing between sources 16a and 16h, the two wave trains will be generally out of phase at any instant at the underwater obstruction. The front portion of the wave train traveling along path 26 will reach the obstruction first and will not be canceled by the later wave train traveling along path 28. However, the sources 16a and 16h are spaced closely enough together so that the later portion of the wave train traveling along path 26 will be out of phase with the wave train traveling along path 28. The greater portion of both reflected wave trains will thus be out of phase when received at points along the hydrophone streamer 20 and will be effectively canceled. Similar cancellation of waves reflected from the same obstruction will occur between wave trains generated by each of the sources 16b–16g, due to the spacing between the sources. The spacing between the sources is selected so that horizontal wave trains having frequencies in the band of particular seismic interest are canceled. Thus, the vertically traveling reflected waves of primary interest received at the hydrophone streamer 20 will not be substantially masked due to horizontal reflections in this instance.

Figure 2:
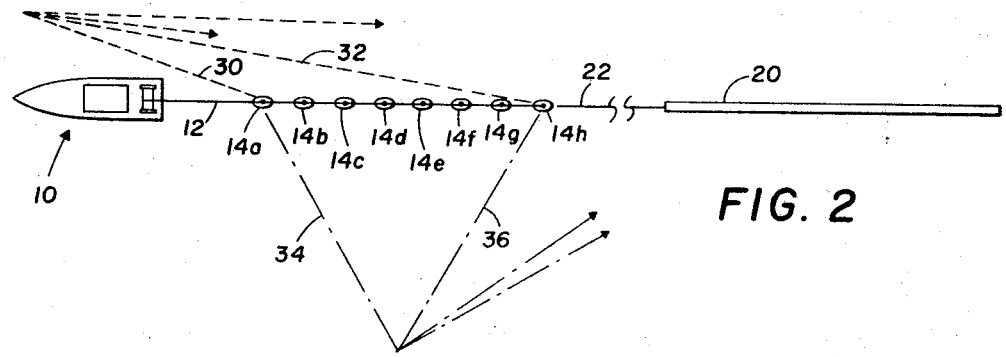
FIGURE 2 illustrates a diagrammatic top view of the embodiment shown in FIGURE 1.

FIGURE 2 illustrates that the primary cancellation of horizontally traveling wave trains according to the invention occurs with respect to reflections occurring either on the line of traverse of the vessel 10 or at relatively small angles thereto. For instance, wave trains traveling from source 16a along the line 30 will be substantially out of phase with horizontally traveling wave trains from source 16h traveling generally along the line 32, due to the horizontal spacing between the sources. Hence, considerable cancellation of these horizontal traveling waves will occur at points along streamer 20.

However, smaller magnitudes of cancellation of horizontally traveling noise is provided by the present invention for reflections occurring at substantially right angles to the line of traverse of the vessel 10. Horizontally traveling waves from source 16a traveling along the line 34 and horizontally traveling waves from source 16h traveling generally along the line 36 will reach a point of reflection at substantially the same time, and the reflected waves from this point will be substantially in phase and little cancellation will occur. However, it will be understood that significant amounts of cancelation of horizontally traveling noise will be provided by the invention in the majority of cases, thereby greatly enhancing the data received by the hydrophone streamer 20.

Figure 3:
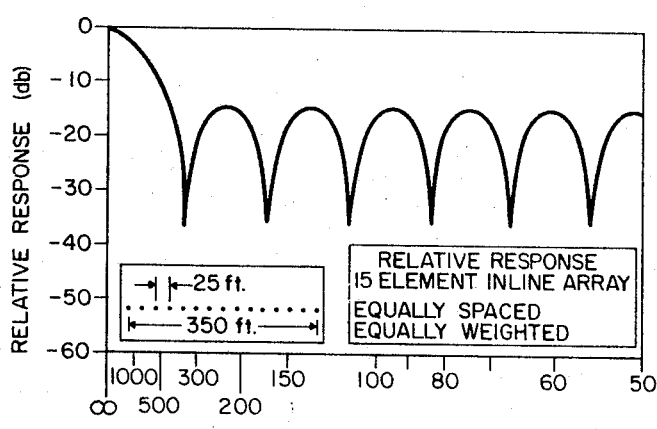
FIGURE 3 is a graphical representation of the relative response of the present system.

FIGURE 3 illustrates the cancellation of horizontally traveling noise with the present invention wherein fifteen seismic wave sources are streamed behind a marine vessel and equally spaced apart twenty-five feet. From the inspection of the graph, only a portion of whichi s shown, it will be seen that practically no attenuation is provided for wavelengths greater than approximately five hundred feet, which includes the wavelengths of most of the vertically traveling direct reflections of interest in marine seismic exploration.

However, for wavelengths of five hundred feet or less, substantial attenuation will occur, as horizontally traveling noise in marine seismic exploration will usually have wavelengths of three hundred feet or less. It will additionally be seen that maximum attenuation of the horizontally traveling noise occurs at spaced wavelengths of approximately 300 feet, 175 feet, 115 feet, 80 feet and the like. This phenomena is due to the relative spacing apart of the seismic wave sources. The spacing between the sources of the invention may thus be varied in order to specifically attenuate a particular wavelength of noise.

Whereas the present invention has been described in detail with respect to a specific embodiment, it is understood that various modifications and changes may be suggested by one skilled in the art, and it is intended to cover such modifications and changes in the appended claims.

What is claimed is:
1. A marine exploration system comprising:
 a marine vessel for moving along exploration traverses,
 (b) an array of spaced apart seismic disturbance generators linearly streamed at constant depths behind said vessel,
 (c) means to simultaneously operate said array to generate a plurality of horizontally spaced seismic disturbances,
 (d) a plurality of seismic wave receivers streamed behind said array of seismic disturbance generators and having a length greater than said array such that said seismic disturbances appear to be generated from a point source, whereby horizontally traveling noise waves from said seismic disturbances are cancelled at said receivers due to phase differences introduced by the horizontal spacing of said seismic disturbance generators.

2. The system of claim 1 and further comprising:
 buoyant means towed behind said vessel for supporting said seismic disturbance generators at a constant horizontal depth.

3. The system of claim 2 wherein said plurality of seismic wave receivers have a length at least ten times the length of said array of seismic disturbance generators.

4. The system of claim 3 wherein ones of said seismic disturbance generators generate disturbances having different fundamental frequencies than others of said seismic disturbance generators.

5. The method of canceling horizontal noise in marine seismic exploration comprising:
 (a) streaming an array of spaced apart seismic disturbance sources at constant levels behind a marine vessel,
 (b) simultaneously generating seismic disturbances at said disturbance sources,
 (c) streaming seismic wave receivers which are spaced along a length sufficiently greater than the length of said array that the vertical components of said seismic disturbances appear at said receivers to be generated from a point source, and
 (d) receiving said seismic disturbances at said receivers such that horizontally traveling waves from said seismic disturbances arrive at each said receiver out of phase with one another due to the spacing of said disturbance sources.

6. The method of claim 5 and further comprising:
 maintaining said sources at predetermined depths under the water during the streaming thereof.

7. The method of claim 5 wherein said seismic disturbances have different fundamental frequencies.

8. The method of claim 5 wherein said disturbance sources and reception points are towed behind the same marine vessel, said disturbance sources being disposed along a generally horizontal line between said marine vessel and said receivers.

References Cited
UNITED STATES PATENTS

| | | | |
|---|---|---|---|
| 1,919,917 | 7/1933 | Truman | 340—15.5 |
| 3,331,050 | 7/1967 | Kilmer et al. | 340—7 |
| 3,335,401 | 8/1967 | Kerns | 181—0.5 |

RODNEY D. BENNETT, Jr., Primary Examiner

C. E. WANDS, Assistant Examiner

U.S. Cl. X.R.

340—7